United States Patent [19]

Steck et al.

[11] Patent Number: 4,558,521
[45] Date of Patent: Dec. 17, 1985

[54] MECHANISM FOR CHECKING THREE-DIMENSIONAL BODIES

[75] Inventors: George L. Steck, Dayton; Raymond E. Steck, Miamisburg; Laurence D. Steck, Dayton, all of Ohio

[73] Assignee: Steck Manufacturing Co., Inc., Dayton, Ohio

[21] Appl. No.: 606,665

[22] Filed: May 3, 1984

[51] Int. Cl.⁴ .............................................. E04F 21/26
[52] U.S. Cl. ........................................ 33/533; 33/572; 403/405.1
[58] Field of Search ........... 33/174 R, 174 PA, 174 P, 33/174 G

[56] References Cited

U.S. PATENT DOCUMENTS

| | | |
|---|---|---|
| 885,001 | 4/1908 | Cameron . |
| 1,230,441 | 6/1917 | Stevens . |
| 1,536,361 | 4/1923 | Tomes . |
| 2,000,866 | 4/1934 | Smith . |
| 2,765,139 | 12/1953 | White . |
| 2,798,296 | 11/1953 | Liskey . |
| 3,151,396 | 10/1961 | Junkins . |
| 3,556,452 | 1/1971 | Ramsey . |
| 3,589,659 | 6/1971 | Larkin . |
| 3,743,228 | 7/1973 | Drab . |
| 3,810,313 | 5/1974 | Hicks . |
| 3,869,804 | 3/1975 | Friend . |
| 3,888,477 | 6/1975 | Tate .................................... 33/174 G |
| 3,936,023 | 2/1976 | Clifton . |
| 4,015,338 | 4/1977 | Kunze et al. . |
| 4,015,339 | 4/1977 | Horvallius . |
| 4,055,061 | 10/1977 | Bayorgeon et al. . |
| 4,098,003 | 7/1978 | Negrin . |
| 4,165,567 | 8/1979 | Olsson . |
| 4,174,623 | 11/1979 | Le Grand et al. . |
| 4,207,681 | 6/1980 | Bayorgeon et al. . |
| 4,242,803 | 1/1981 | Dory . |
| 4,329,784 | 5/1982 | Bjork . |
| 4,342,154 | 8/1982 | Le Grand . |
| 4,366,624 | 1/1983 | Bergstrom . |
| 4,386,468 | 6/1983 | Whitney . |
| 4,413,420 | 11/1983 | Hoffman et al. . |
| 4,442,608 | 9/1982 | Clausen . |
| 4,463,937 | 8/1984 | Celette . |

*Primary Examiner*—Robert I. Smith
*Attorney, Agent, or Firm*—Dybvig & Dybvig

[57] ABSTRACT

A measuring system for measuring bodies, such as vehicle bodies, is of a type which includes a main frame attached to and suspended under the body. Novel crossing clamps allow crossbars to be attached to the main frame at whatever position on the main frame that the operator should desire.

17 Claims, 12 Drawing Figures

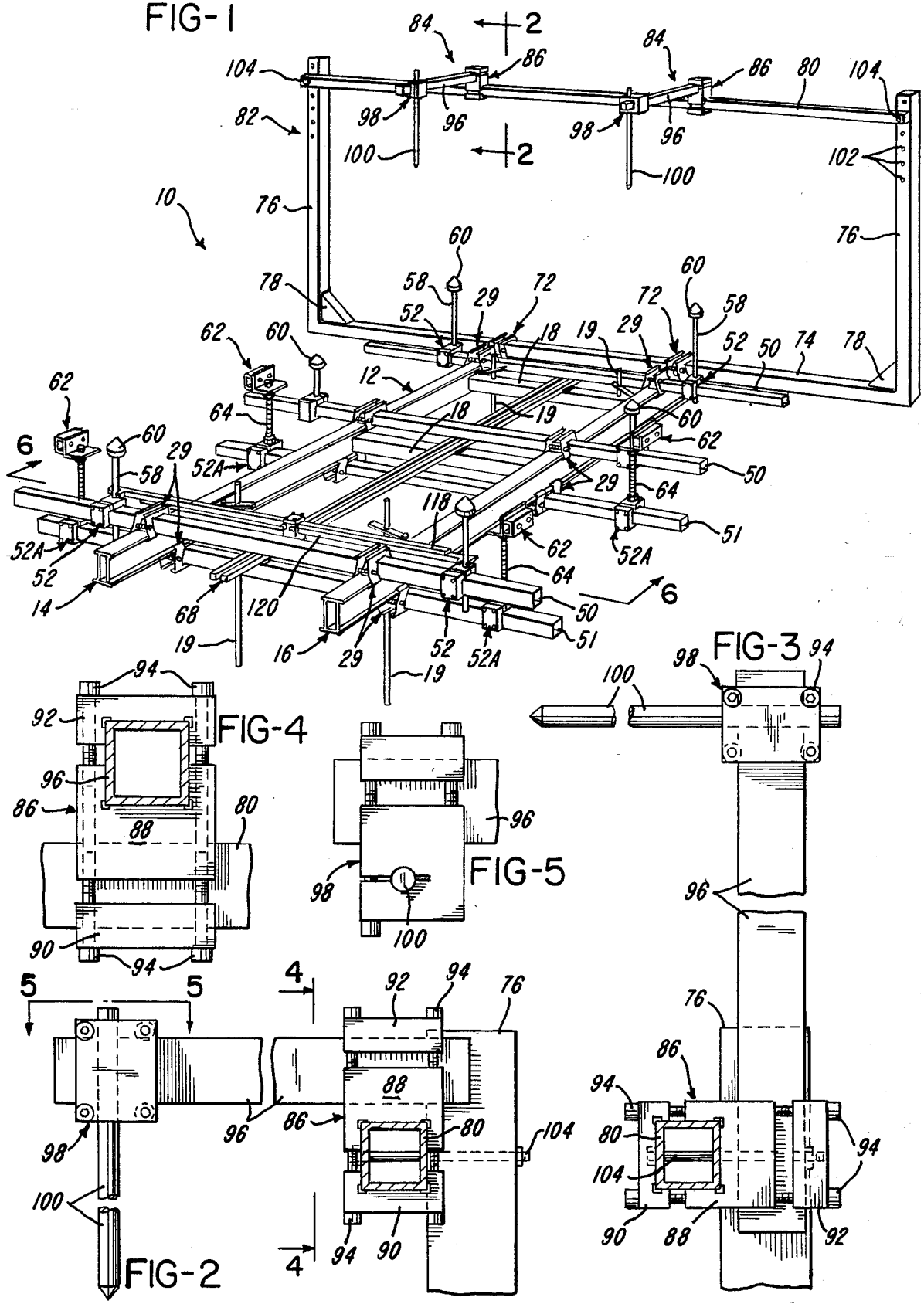

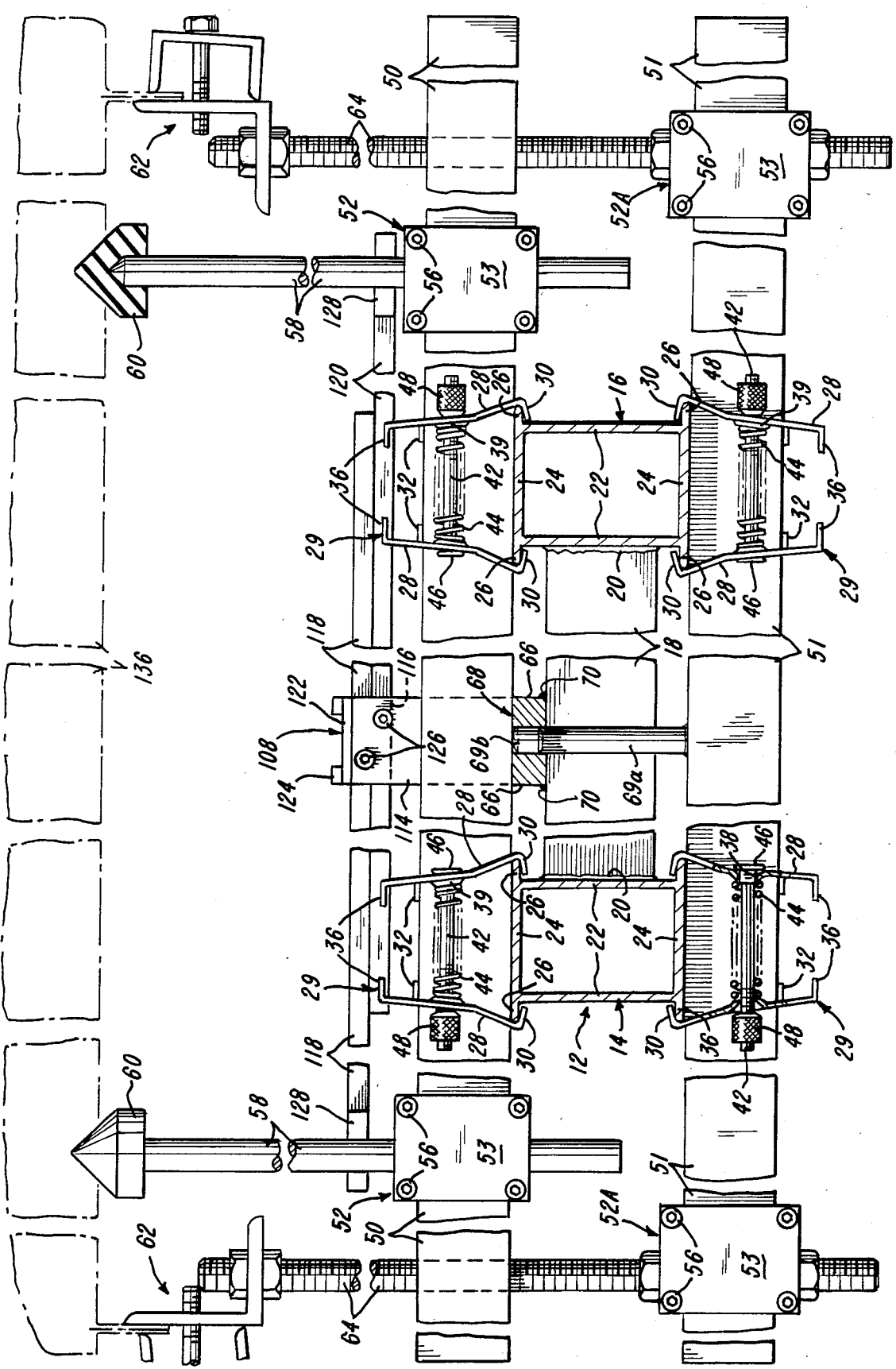

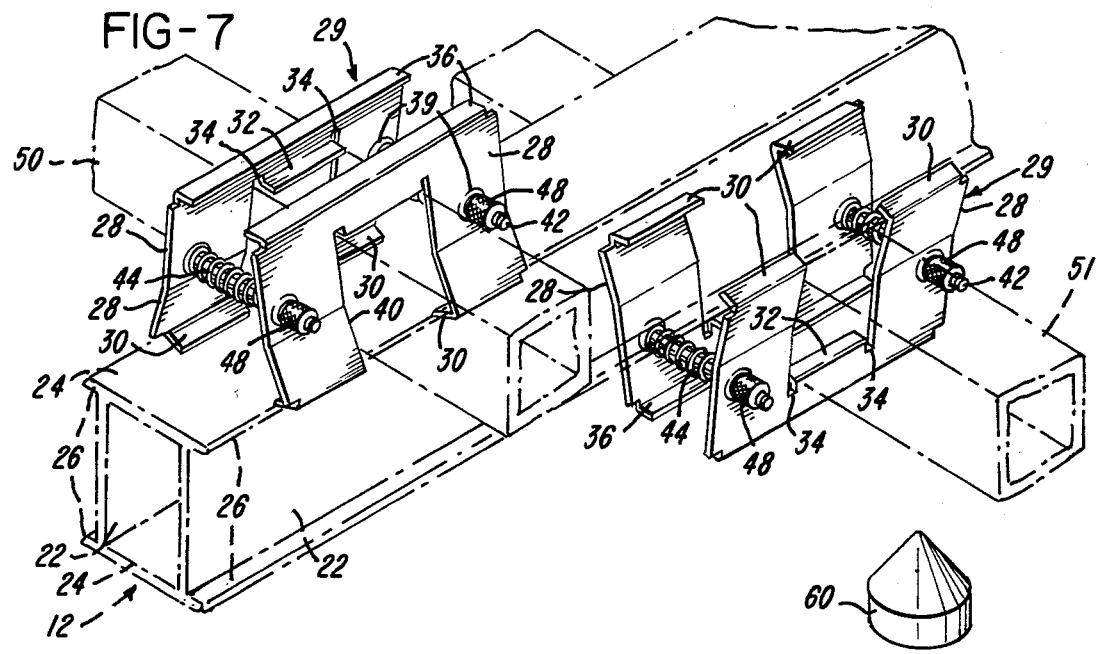
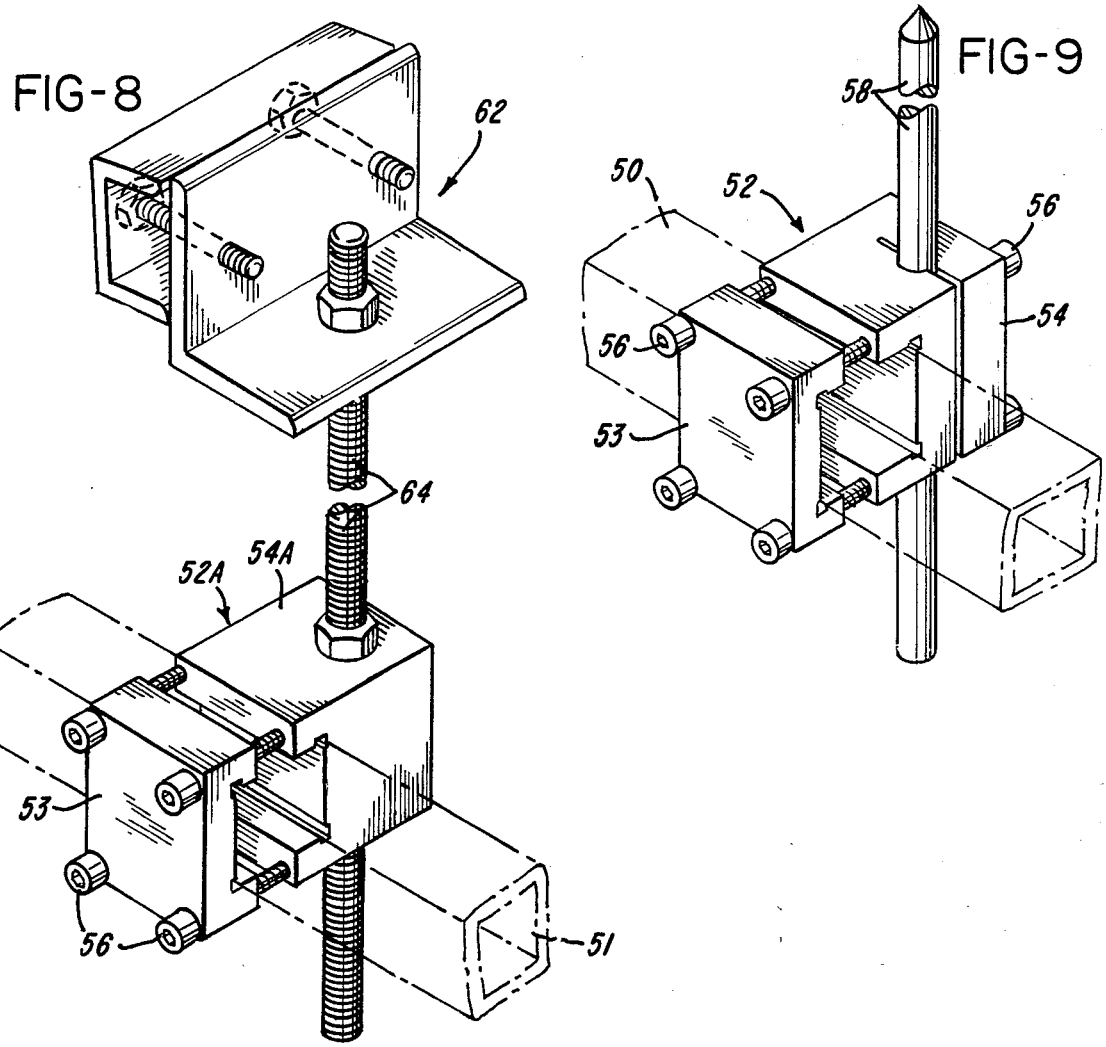

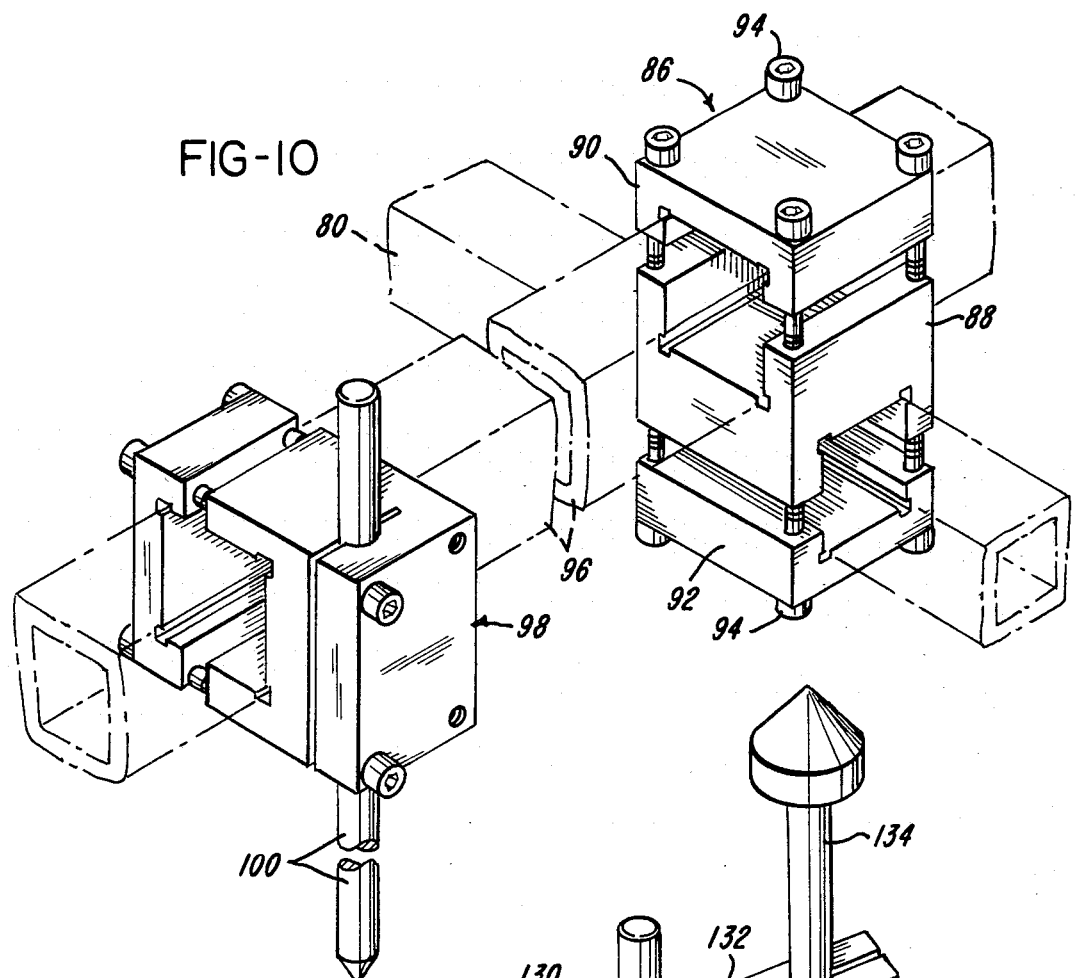
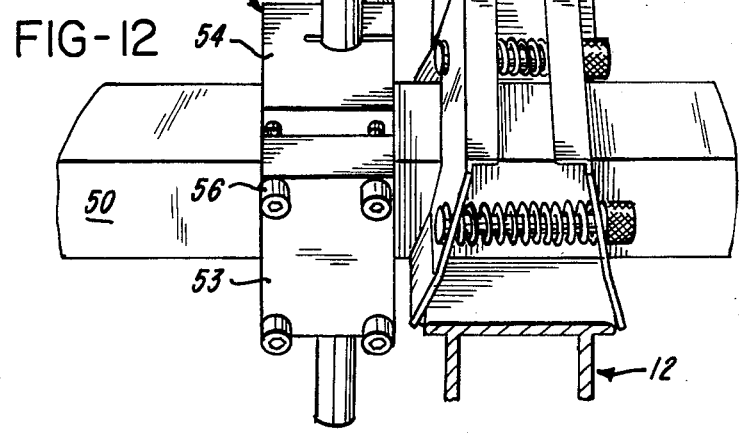

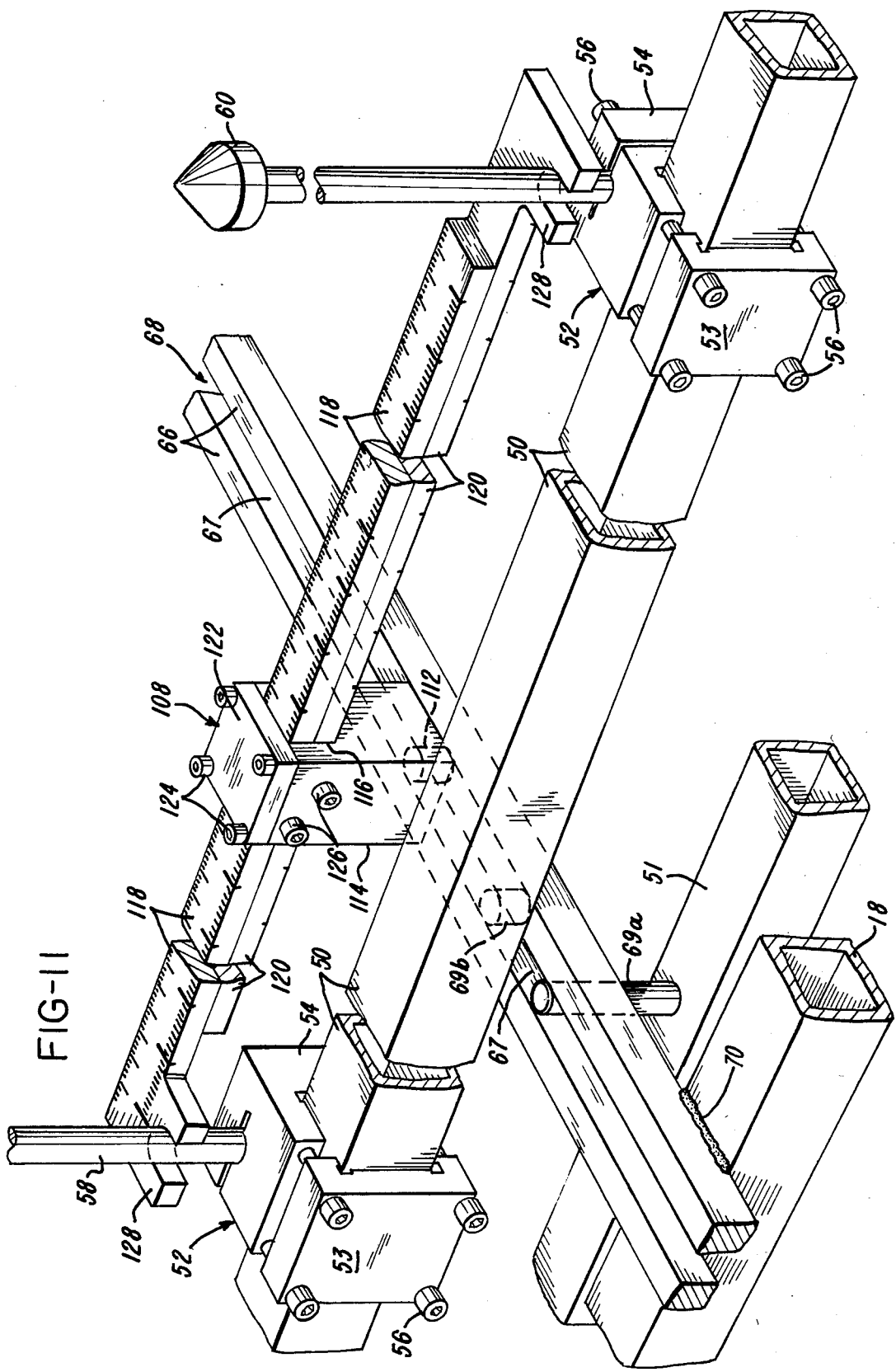

MECHANISM FOR CHECKING THREE-DIMENSIONAL BODIES

SUMMARY OF THE INVENTION

The present invention relates to the checking of three-dimensional bodies such as automobile bodies utilizing a checking mechanism of the type wherein the checking mechanism includes a main measuring frame attached to and suspended under the body to be checked. The checking mechanism is characterized by a ruggedly constructed main frame formed by extruded aluminum box sections having, generally, an I-beam configuration. Two of the I-beam shaped box sections are assembled in spaced apart and parallel relationship by means of one or more girders welded to outside walls of the box sections at locations where the girders are spaced from the I-beam flanges. This leaves the I-beam flanges unobstructed so that specially designed crossing clamps can be engaged to the I-beams anywhere along the length of the I-beam top surface or bottom surface. The aforementioned crossing clamps are designed to interfit hollow extruded crossbars which, because of the freedom for movement of the crossing clamps along the length of the I-beams, may be positioned at any desired location along the length of the I-beams and may be used to support mounting brackets for pointers. The pointers, which are adjustable lengthwise and crosswise of the I-beam and also vertically up or down with respect to the main frame, are used to locate datum points present on the body being checked and are also used by reference to the manufacturer's *Chassis Dimension Manual* to indicate the extent of correction required to restore a damaged or misshapened body to its original shape. To facilitate the placement of the pointers, the measuring mechanism has a built-in center reference from which all pointer locations can be measured to within a few fractions of an inch. The checking mechanism includes a strut tower frame which may be adjustably positioned on the main frame to support overhead pointers for use in checking datum points on struts, radiator supports, and other under-the-hood locations which would be inaccessible from below.

BRIEF DESCRIPTION OF THE DRAWINGS

In the drawings:

FIG. 1 is a perspective illustration of the present invention.

FIG. 2 is a fragmentary section view taken substantially along the line 2—2 of FIG. 1.

FIG. 3 is a fragmentary section view analogous to FIG. 2 but showing the structure in a different position.

FIG. 4 is a fragmentary section illustration taken substantially along the line 4—4 of FIG. 2.

FIG. 5 is a fragmentary plan illustration taken substantially along the line 5—5 of FIG. 2.

FIG. 6 is a fragmentary section view taken substantially along the line 6—6 of FIG. 1, with phantom lines fragmentarily illustrating broken apart portions of the lower portion of an automobile body.

FIG. 7 is an enlarged fragmentary illustration showing a portion of the main frame with crossbars clamped thereto, the clamps being shown in solid lines and the main frame and crossbar being shown with broken lines.

FIG. 8 is an enlarged fragmentary illustration of a pinch weld clamp and its supporting structure, with a portion of the crossbar being shown with phantom lines.

FIG. 9 is an enlarged fragmentary illustration of a datum pointer and its supporting structure, with a crossbar illustrated by phantom lines.

FIG. 10 is an enlarged fragmentary illustration, with a portion broken away, showing a strut frame crossbar and mounting structure associated therewith.

FIG. 11 is an enlarged fragmentary illustration of a measuring device mounted on a centerline guide structure of the present invention.

FIG. 12 is an enlarged fragmentary illustration showing an offset pointer clamp for avoiding a crossing clamp.

DETAILED DESCRIPTION

The checking mechanism of the present invention is broadly identified in FIG. 1 by the reference number 10. Included in the checking mechanism is a main frame 12 comprising a left box section 14 and a right box section 16. The box sections 14 and 16 are heavy walled (⅛" thick), extruded aluminum sections which are shaped to have horizontal (as illustrated in FIG. 6) plates 24 defining the top and bottom surfaces of the box sections, each plate 24 having flanges 26 projecting outboard of the box section sides to give the hollow box section the configuration of a hollow I-beam. Extending vertically (as illustrated in FIG. 6) between the horizontal plates 24 are side plates 22. Extending between the box sections 14 and 16 are a plurality of girders 18 whose ends are welded to the side plates 22 of the confronting sides of the box sections 14 and 16. The welding 20 of the girders 18 is such that the girders 18 are spaced between the flanges 26 and do not make contact with the flanges 26. Thus, the flanges 26 provide continuously uninterrupted crossing clamp attachment surfaces on both the top sides and the bottom sides of the box sections 14 and 16.

FIG. 6 and 7 illustrate a crossing clamp 29 which is of a type suitable for attachment to the flanges 26. The crossing clamp 29 comprises a pair of duplicate plates 28 assembled in face-to-face relationship by means of a fastener 42 passing centrally through a compression spring 44 separating the plates 28. The fastener 42 has an enlarged head 46 at one end thereof and is threaded at the opposite end thereof for engagement by a thumb nut 48. The thumb nut 48 is preferably knurled on its outside surfaces for convenient finger manipulation. As evident in FIG. 7, two fastener, spring, and thumb nut assemblies hold the plates 28 in confronting relationship.

Each of the plates 28 is bent adjacent its lowermost edge to form a bottom flange 30. Each plate 28 is further bent adjacent its upper edge to form a top flange 36. Between the flanges 30 and 36 a central portion of the plate 28 has been cut away to form a cutout 40 bounded along its top by a middle flange, or lintel, 32 (which is best seen in FIG. 6) extending in the same direction as do the other flanges 30 and 36. As apparent in FIG. 7, the lintel 32 has been separated from the walls of the plate 28, which define the cutout 40, by slots 34. Also, the apertures through the plate 28, which receive the fasteners 42, comprise square holes 38 formed in recesses 39 which have been pressed outwardly from one face of the plate 28. The square holes 38 are used so that the fasteners 42 will not spin against the torque applied by the thumb nuts 48.

The cutouts 40 and the crossing clamps 29 are sized to receive hollow, and essentially square in section, extruded upper crossbars 50. The upper crossbars 50, which lie transversely over the box sections 14 and 16 and rest against their top plates 24, are held in position by the crossing clamps 29 as follows.

One can assume the thumb nuts 48 to be screwed onto the fasteners 42 sufficiently to lightly draw the plates 28 against the ends of the springs 44. This holds the plates 28 in a spaced apart, confronting relationship with the heads 46 cooperating with the conically shaped ends of the thumb nuts 48 to hold the plates 28 in a face-to-face relationship. An operator can then press the top flanges 36 toward each other whereupon the plates 28 pivot, with the springs 44 acting as a fulcrum to spread apart the bottom flanges 30. With an upper crossbar 50 lying in position on an underlying plate 24, the crossing clamp 29 may be slid downwardly onto the upper crossbar 50 which enters the cutouts 40. Having lowered the crossing clamp 29 into position on the upper crossbar 50, the operator may release his grip on the top flanges 36, whereupon the expansion of the springs 44 will cause the bottom flanges 30 to slide under the flanges 26 projecting outwardly from the underlying box section. The crossing clamp 29 thus becomes latched to the underlying box section. For this latching action to occur, the crossing clamp 29 has been designed so that the separation between the bottom flanges 30 and the lintels 32 is slightly greater than the outside wall dimension of the upper crossbar 50.

Having thus placed the crossing clamp 29 on the underlying box section so as to partly surround and thus, lightly secure the upper crossbar 50, the operator may then tighten the thumb nuts 48 with the consequence that the lintels 32 are moved together against the resistance of the springs 44 and, as the lintels 32 move toward one another, the plates 28 are pivoted about the lower flanges 26. Simultaneously, with this pivoting motion, the lintels 32 bear against the top surfaces of the upper crossbar 50. In time, the tightening of the thumb nuts 48 draws the top flanges 36 as close together as is possible because the space between the lintels 32 and the bottom flanges 30 has become filled by the upper crossbar 50.

Having once adjusted a crossing clamp 29 to secure an upper crossbar 50 as described, it requires only a slight loosening of the thumb nuts 48 to allow the crossing clamp 29 to be released from its engagement with the underlying box section. The upper flanges 36 provide a sufficient reinforcement for the plates 28 so that the crossing clamps 29 may be repositioned without distortion of the plates 28.

FIG. 1 shows two of the crossing clamps 29 securing each of three upper crossbars 50 on the top plates 24 of the box section 14 and 16. Lower crossbars 51 are secured to the bottoms of the box sections 14 and 16 by additional crossing clamps 29.

Mounting brackets 52A are bolted to the lower crossbars 51 and, similarly, additional mounting brackets 52 are bolted to the upper crossbars 50.

As seen in FIG. 8, the mounting bracket 52A comprises a U-shaped part 53 and a clamp portion 54A. The clamp portion 54A receives threaded bolts 56, which are screwed into suitable threaded bores entering the ends of clamp portions 54A. When the bolts 56 are securely tightened, the clamp portion 54A is drawn toward the ends of the U-shaped part so as to securely squeeze the lower crossbar 51 and thus fix the position of the mounting bracket 52A along the length of the crossbar 51. Clamp portion 54A also has an aperture to receive the threaded rod 64 which is secured to the mounting bracket 52A by two nuts, one on each side of the clamp portion 54A but only one of which appears in FIG. 8.

The slitted clamp portion 54 shown in FIG. 9 is identical to clamp portion 54A, however, it also has a slit through the aperture and additional threaded bores to receive additional bolts 56, which are used to securely clamp a pointer rod 58.

There are ordinarily two pointer caps 60 attached to each upper crossbar 50 and two pinch clamps 62 attached to each of the lower crossbars 51. Those skilled in the art will appreciate, however, that the number of pinch clamps employed on lower crossbars 51 and the number of pointer elements employed on upper crossbars 50 can vary widely depending upon the requirements of any particular measurement operation. Furthermore, since the crossbars 50 and 51 are of the same cross sectional area, the mounting brackets 52 may be interchanged as between crossbars 50 and 51 as the operator desires.

As shown in FIG. 11, fixed at central locations to at least some of the girders 18 are reference bars 66, there being two reference bars 66 positioned in side-by-side spaced apart relationship to form a center reference guide 68 which extends longitudinally and centrally between the box sections 14 and 16. The two reference bars 66, which collectively form the center reference guide 68, are carefully mounted on the girders 18 in their spaced apart relationship by means of welds 70. The two reference bars 66 provide a slot 67 for receiving a dowel pin 112 projecting downwardly from a block 114. The block 114, which is essentially square in cross section, is slidable along the length of the spaced apart reference bars 66. The block 114 has a channel 116 formed at its upper end and sized to receive two meter sticks or the like which are stacked one on top of the other. The upper meter stick 118 has indicia observable from above, whereas the lower meter stick 120 has indicia observable from below.

The channel 116 is sized for receipt of the two meter sticks 118 and 120 and is closed across its top by a closure plate 122 secured by fasteners 124 to the block 114. Threadably engaged to a side wall of the block 114 is a pair of bolts 126. One of the bolts 126 is positioned to lock the position of the meter stick 118, whereas the other bolt is adjustable to lock the position of the meter stick 120. Each of the meter sticks 118 and 120 carries, at one end thereof, a forked bracket 128.

The two meter sticks 118 and 120, together with the block 114 and its depending dowel pin 112, comprise a measuring device 108 which is separable from the balance of the measuring system. Thus, an operator may lift the measuring device 108 as he wishes and lower the dowel pin 112, wherever convenient, into the slot 67. As the measuring device 108 is thus mounted wherever the operator desires, the forked brackets 128 define locations for pointer rods 58. In a typical operation the operator will, by reference to the manufacturer's *Chassis Dimension Manual*, have ascertained the proper locations for the pointer rods 58. This proper location is locked into the measuring device 108 by tightening bolts 126. After the block 114 has been placed in the desired position, the operator then adjusts the mounting bracket 52, whose position is to be established, for any pointer rod cap 60 being positioned to allow a pointer rod 58 and its mounting bracket 52 to be slid into the position indicated by the forked bracket 128. Usually, a given setting for the measuring device 108 will enable the operator to position two pointer rods 58, one being positioned by the meter stick 118 and the other being positioned by the meter stick 120.

If the operator is performing a checking operation, he will have first mounted the main frame to the vehicle to be checked by means of the pinch clamps 62. FIG. 6 illustrates with phantom lines a vehicle body 136 mounted by means of pinch clamps 62 engaging pinch welds of the vehicle body. For convenience, the vehicle body 136 has been broken into several smaller sections so that the body will fit between the two pinch clamps 62 illustrated in FIG. 6. The pointer caps 60 appearing in FIG. 6 are used as citing devices to indicate where the metal of the vehicle being checked should be located after a repair operation has been completed. If the metal is not in its proper location, the operator then knows the amount of correction that will be required for repair of the distorted area. In the preferred embodiment, the pointer cap 60 adds one half inch to the height of the pointer rod 58 so that the operator can easily judge how close to place pointer rod 58 to the vehicle and still leave room for the pointer cap 60.

Mounted to one end of the main frame 12, as it appears in FIG. 1, is a strut tower frame 82. This strut tower frame 82 is formed of sturdy aluminum beams which are approximately square in cross section. These aluminum beams are preferably hollow and of substantial walled thickness, such as ⅛ inch. Referring further to the lowermost crossbar 74, this is clamped to the plates 24 of the boxed sections 14 and 16 by means of crossing clamps 72. The crossing clamps 72 are of the same general construction as the crossing clamps 29 but are sized to larger dimensions so as to accommodate the larger cross sectional dimension of the crossbar 74. Obviously, by operation of the larger crossing clamps 72, the crossbar 74 may be attached by the operator at any desired location on the main frame 12.

Referring further to the crossbar 74, it is sturdily connected to upright posts 76 by means of gussets 78. There is one upright post 76 mounted to each end of the crossbar 74.

Extending between the upper ends of the upright posts 76 is a crossbar 80. The crossbar 80 is secured at any desired elevation by means of bolts 104 entering apertures 102 located in the upright posts 76.

The crossbar 80 mounts double mounting brackets 86, which are best illustrated in FIGS. 2 and 3, the brackets 86 each comprising a centrally located block member 88 to which is bolted a U-shaped clamp member 90 by means of bolts 94. The clamp member 90, when bolted, cooperates with the block member 88 to seize upon the crossbar 80 wherever the operator desires such seizure to occur.

Mounting bracket 86 also includes a second clamp means 92 secured to block member 88 by means of additional bolts 94. The bolts 94, when tightened, cross the second clamp means 92 to seizingly engage a tubular offset beam 96. This offset beam 96 is of a rectangular configuration.

As evident in FIG. 1, two offset beams 96 are mounted to the crossbar 80. At their outer ends, the offset beams 96 support brackets 98 for mounting pointers 100.

As the pointers 100 appear in FIGS. 1 and 2, they point downwardly. As they appear in FIG. 3, they point horizontally. The transition from downward pointing in FIG. 2 to the horizontal position in FIG. 3 is allowed to occur by a rotation of the double mounting bracket 86, which rotation is permitted by a loosening of the bolts 94 passing through the clamp member 90 to engage the block member 88. The strut tower 82 is thus an adjustable strut tower in several respects. The strut tower 82 may be adjusted along the length of the main frame 12. The crossbar 80 may be adjusted upwardly or downwardly, and the pointers 100 may be adjusted to point either horizontally or vertically.

The strut tower 82 is used to identify datum points and lines on the vehicle being checked, i.e., the vehicle 136 schematically shown in FIG. 6, and is used primarily to identify datum points on the top portions of the vehicle body or datum points under the hood of the vehicle when the pointers 100 point downwardly. When the pointers 100 point horizontally, the strut tower is ordinarily being used primarily to check front and rear window mountings.

As one skilled in the art will appreciate after review of FIG. 10, there are several degrees of freedom available to the mounting for the strut tower pointers 100, these degrees of freedom resulting from the ease with which the offset beams 96 and the double mounting bracket 86 may be positioned.

In addition to identifying specific datum points, the upright post 76 and the crossbar 80 of the strut tower 82 can be used as reference points for measuring vehicle features in relation to the manufacturer's catalog.

Referring to FIG. 11, the upper crossbars 50 have preferably mounted, thereunder, dowel pins 69b which enter the slot 67, thus to fix the longitudinal extent of the upper crossbar 50 with respect to the main frame 12. Since the dowel pin 69b and 112 enter the same slot 67, the dowels 69b and 112 automatically register the meter sticks 118 and 120 with respect to the upper crossbars 50. Also, since the dowel 112 projects downwardly from the block 114, it is evident that the measuring device 108 can be positioned anywhere along the center reference guide 68. Thus, the mounting device 108 will be effective to locate pointers 60 anywhere along the main frame 12.

The lower crossbars 51 may also carry upwardly pointing and somewhat elongated dowels 69a for the same purposes.

Referring to FIG. 12, there sometimes occurs a situation in which one of the pointer caps 60 is needed to occupy the same position as one of the crossing clamps 29. When this type of interference occurs, the present invention utilizes an offset pointer mechanism. This offset mechanism comprises a clamp 130 having a partially slitted body 132. One of the slits in the body 132 is adapted to receive a pointer rod 58 and the other slit is adapted to receive a shortened pointer rod 134 which can mount any suitable pointer device. The pointer rod to which the clamp 130 may be attached will itself be supported by a mounting bracket 52, as is shown in FIG. 12. The clamp 130 permits the shortened pointer rod 134 to be positioned above the obstruction such as one of the crossing clamps 29, as is clearly shown in FIG. 12.

FIG. 1 illustrates a plurality of friction jacks 19 extending downwardly from the main frame 12. These friction jacks are used primarily in a set-up operation in which pointers are mounted by means of the mechanism described in this application in accordance with the manufacturer's design specifications. A vehicle to be repaired may then be lowered into position for attachment of pinch clamps 62 to pinch welds of the vehicle, thus to attach the main frame 12 to the vehicle. The vehicle, together with the main frame 12, may then be supported by any desired vehicle shaping mechanism, whereupon the friction jacks 19 will no longer be needed.

The present invention has been described as utilizing hollow box sections for the longitudinal I-beam members 12 and 14, for the crossbars 50 and 51, and for other components, such as the strut tower mechanism. These box sections are preferably constructed of sturdy aluminum extrusions and offer the advantage of providing a reasonably light-weight, easily assembled vehicle measuring structure. It is to be appreciated, however, that while hollow box sections are preferred in the practice of this invention, other structural elements, such as I-beams which are not hollow, may also be used in the practice of the present invention.

FIG. 1 shows the crossbars 50 secured to the top and crossbars 51 secured to the bottom of the box sections 14 and 16, however, this is only one arrangement of the crossbars and is not meant to limit the versatility of the mechanism. For example, the operator could arrange all of the crossbars underneath the box sections 14 and 16 in order to meet spatial limitations created when the checking mechanism is attached to an automobile.

Although the preferred embodiments of this invention have been described, it will be understood that various changes may be made within the scope of the appended claims.

Having thus described our invention, we claim:

1. A vehicle checking mechanism comprising a pair of beams supported in spaced apart and parallel relationship by means of transverse girders welded therebetween, a plurality of spreadable crossing clamps removably attached to said beams, a plurality of upper crossbars spanning said beams, and each received by a pair of said crossing clamps, one on each of said beams, each said crossbar slidably engaged by a mounting bracket, and a reference pointer mounted to each of said mounting brackets.

2. The checking mechanism of claim 1 wherein each of said beams is a hollow box section having an I-beam shape, and said clamps each comprise a pair of U-shaped brackets with each bracket having a flange for engaging an edge of said I-beam, each clamp further including first means for biasing said brackets apart and second means for limiting the separation of said brackets, the U-shape of said brackets defining a passageway through said brackets for one of said crossbars.

3. A vehicle checking mechanism comprising a pair of I-beams, each having flanges defining an I-beam exterior shape, said I-beams supported in spaced apart and parallel relationship by means of transverse girders welded to said I-beams remotely from said flanges, a plurality of crossing clamps removably attached to said flanges, a plurality of crossbars spanning over said I-beams and each received by a pair of said clamps, one clamp on a flange of one I-beam and the other clamp on the flange of the other I-beam, each said crossbar slidably engaged by a mounting bracket and means for mounting a reference pointer on said bracket.

4. The vehicle checking mechanism of claim 3 wherein said I-beams each have an upper flange portion and a lower flange portion, there being a plurality of first clamps mounted to said upper flange portions.

5. The checking mechanism of claim 4, including at least one second clamp attached to the lower flange portion of one of said I-beams.

6. The checking mechanism of claim 5, including an additional second clamp attached to the lower flange portion of the other of said I-beams and including a lower crossbar supported by said second clamp and said additional second clamp.

7. The checking mechanism of claim 6, including a lower mounting bracket slidably affixed to said lower crossbar, a pinch weld clamp, and means affixing said pinch weld clamp to said lower crossbar.

8. In a vehicle checking mechanism, a frame having an I-beam, a crossing clamp engaged to said I-beam, said crossing clamp having window means for receiving a crossbar, and a crossbar passing through said window means and secured to said I-beam by said crossing clamp.

9. In a vehicle checking mechanism, a main frame having spaced apart and parallel I-beams, a plurality of girders extending between and fixedly attached to said I-beams, and centerline guide bars mounted to said girders and extending longitudinally and centrally between said I-beams.

10. In a vehicle checking mechanism according to claim 9 wherein said centerline guide bars define a slot therebetween, and including a measuring device comprising block means adjustably supporting thereon a measuring stick, and said block means having a dowel pin fitted in said slot.

11. A clamp mechanism attachable to a flanged beam for mounting to said flanged beam a transversely disposed crossbar, said clamp mechanism comprising first and second plate members, each said plate member having a window for receiving said crossbar and a lintel above said window, each said plate having a bottom flange spaced from said lintel for hooking said flanged beam, said plate members having fastener attachment means, and a fastener engaging said attachment means.

12. A clamp mechanism as recited in claim 11 wherein said plate members are substantially identical and arranged symmetrically opposite.

13. A clamp mechanism as recited in claim 11 including a compression spring surrounding said fastener.

14. A clamp mechanism as recited in claim 13 wherein said compression spring coacts with said plates to separate the same, and including a threaded means engaging said fastener for opposing said compression spring.

15. A clamp mechanism as recited in claim 11 wherein said attachment means comprises an aperture in each plate aligned to receive said fasteners.

16. In a vehicle checking mechanism, a horizontally disposed main frame comprising spaced apart and parallel I-beams having upper and lower flange portions, a pair of crossing clamp means, one secured to a flange portion of each of said I-beams, and a strut tower frame having a lower crossbar, said crossing clamps having windows receiving said lower crossbar and clamping said lower crossbar to said I-beams, said strut tower frame adjustably supporting a vertically elevated crossbeam, and said crossbeam adjustably supporting pointers.

17. In a vehicle checking mechanism of the type comprising a main frame having parallel I-beams and crossing clamps secured to said I-beams for supporting crossbars on said main frame, a mounting bracket affixed to one of said crossbars for supporting a pointer rod, and an offset pointer clamp engaged to said pointer rod for mounting a pointer which is offset from said pointer rod.

* * * * *